United States Patent [19]
Hosokawa et al.

[11] Patent Number: 5,233,378
[45] Date of Patent: Aug. 3, 1993

[54] CAMERA HAVING POP-UP TYPE STROBE INCORPORATED THEREIN

[75] Inventors: Tetsuo Hosokawa; Tomoaki Itabashi, both of Tokyo, Japan

[73] Assignee: Asahi Kogaku Kogyo Kabushiki Kaisha, Tokyo, Japan

[21] Appl. No.: 834,802

[22] Filed: Feb. 13, 1992

[30] Foreign Application Priority Data

Feb. 14, 1991 [JP] Japan .............................. 3-012736[U]
Feb. 14, 1991 [JP] Japan .............................. 3-012737[U]

[51] Int. Cl.$^5$ ............................................. G03B 15/03
[52] U.S. Cl. ............................................. 354/149.11
[58] Field of Search ............... 354/145.1, 149.1, 149.11

[56] References Cited

U.S. PATENT DOCUMENTS

| | | | |
|---|---|---|---|
| 4,153,355 | 5/1979 | Ikawa et al. | 354/149.11 X |
| 4,515,453 | 5/1985 | Wakabayashi et al. | 354/149.1 |
| 4,893,139 | 1/1990 | Alligood et al. | 354/149.1 |
| 4,893,140 | 1/1990 | Yamamoto et al. | 354/149.11 |
| 4,910,542 | 3/1990 | Yamamoto et al. | 354/149.11 |
| 4,983,998 | 1/1991 | Hirohata et al. | 354/149.1 |
| 4,994,846 | 2/1991 | Kobayashi et al. | 354/418 |
| 5,005,042 | 4/1991 | Sato et al. | 354/412 |
| 5,055,866 | 10/1991 | Takebayashi | 354/149.1 |
| 5,065,177 | 11/1991 | Yamamoto et al. | 354/403 |
| 5,066,967 | 11/1991 | Yamamoto et al. | 354/149.11 |
| 5,079,574 | 1/1992 | Ueno | 354/149.11 |
| 5,134,433 | 7/1992 | Takami et al. | 354/149.11 X |

FOREIGN PATENT DOCUMENTS

2237397  5/1991  United Kingdom .

Primary Examiner—Michael L. Gellner
Assistant Examiner—Howard B. Blankenship
Attorney, Agent, or Firm—Sandler Greenblum & Bernstein

[57] ABSTRACT

A camera has a pop-up strobe incorporated therein, including a light emitting unit which is movable between a retracted position, in which it is retracted into a camera body, and a pop-up position, in which the light emitting unit projects from the camera body. A manual actuating switch for moving the light emitting unit from the retracted position to the pop-up position, and a drive mechanism for driving the light emitting unit into the pop-up position in accordance with the operation of the manual actuating switch are provided, as is a mode changing switch for changing light emission modes of the light emitting unit. The manual actuating switch includes at least a part of the mode changing switch when the light emitting unit is in the pop-up position.

12 Claims, 9 Drawing Sheets

CAMERA HAVING POP-UP TYPE STROBE INCORPORATED THEREIN

BACKGROUND OF THE INVENTION

1. Field of the Invention

The present invention relates to a camera having a pop-up type strobe incorporated therein, including a retractable light emitter which can be projected from a camera body.

2. Description of Related Art

Conventionally, in a camera having a built-in pop-up strobe, a light emitter can be popped up by a manual switch. Upon taking a picture with the strobe, a photographer actuates the manual switch to project the light emitter from the camera body with the help of a motor drive or spring force.

A recent strobe has a plurality of light emission modes, including an automatic light modulation mode, a daylight synchronized flash mode (compulsive light emission mode), and a red-eye phenomenon preventing daylight synchronized flash mode (with a pre-emission function), etc. Furthermore, in a known expensive single lens reflex camera, it is possible to switch between a first blind (i.e., leading curtain) synchronized flash mode and a second blind (i.e., trailing) curtain synchronized flash mode.

In such a conventional camera having a built-in pop-up strobe, a selection switch, for selecting the light emission modes is provided separately from the manual switch for the pop-up operation as a result of their separate functions. Therefore the manual switch cannot be used for any other purpose when the strobe is in the popped-up position.

SUMMARY OF THE INVENTION

The inventors of the present invention have focused on the conventional manual switch which has been used only for the purpose of projecting the pop-up strobe from the camera body.

The primary object of the present invention is to provide an apparatus in which the manual switch can be effectively used not only to project the pop-up strobe, but also to switch between the light emission modes.

Namely, the present invention is aimed at the provision of a camera having a pop-up strobe incorporated therein, in which a manual switch for actuating a light emitter of a pop-up strobe can be used, at least as part of a selection switch for selecting the light emission modes.

To achieve the object mentioned above, according to the present invention, there is provided a camera having a pop-up strobe incorporated therein, comprising a light emitting unit which is movable between a retracted position in which the unit is retracted into a camera body, and a pop-up position, in which the light emitting unit projects from the camera body. A manual actuating mechanism is provided for moving the light emitting unit from the retracted position to the pop-up position and a drive mechanism is provided for driving the light emitting unit into the pop-up position in accordance with the operation of the manual actuating mechanism. A mode changing mechanism for changing light emission modes of the light emitting unit, is provided wherein the manual actuating mechanism includes at least a part of the mode changing mechanism when the light emitting unit is in the pop-up position.

According to another aspect of the present invention, there is provided a camera having a pop-up strobe incorporated therein, including a light emitting unit which is movable between a retracted position, in which it is retracted into a camera body, and a pop-up position, in which the light emitting unit projects from the camera body. A manual actuating switch, which is actuated to move the light emitting unit from the retracted position to the pop-up position, and a mode changing switch, which is actuated to change light emission modes of the light emitting unit are also provided. The emission modes are changed by the operation of the mode changing switch only when the light emitting unit is in the pop-up position, and when the manual actuating switch is actuated.

According to still another aspect of the present invention, a camera having a pop-up strobe incorporated therein, includes a light emitting unit which is movable between a retracted position, in which it is retracted into a camera body and a pop-up position, in which the light emitting unit projects from the camera body. A mode changing mechanism for changing light emission modes of the light emitting unit, a slidable actuating mechanism, a moving mechanism for moving the light emitting unit to the pop-up position when the slidable actuating mechanism is actuated and when the light emitting unit is in the retracted position are provided. The mechanism for changing the light emission modes is effected when the slidable actuating mechanism is actuated and the light emitting unit is in the pop-up position.

The present disclosure relates to subject matter contained in Japanese utility model applications No. 3-12736 and No. 3-12737 (both filed on Feb. 14, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
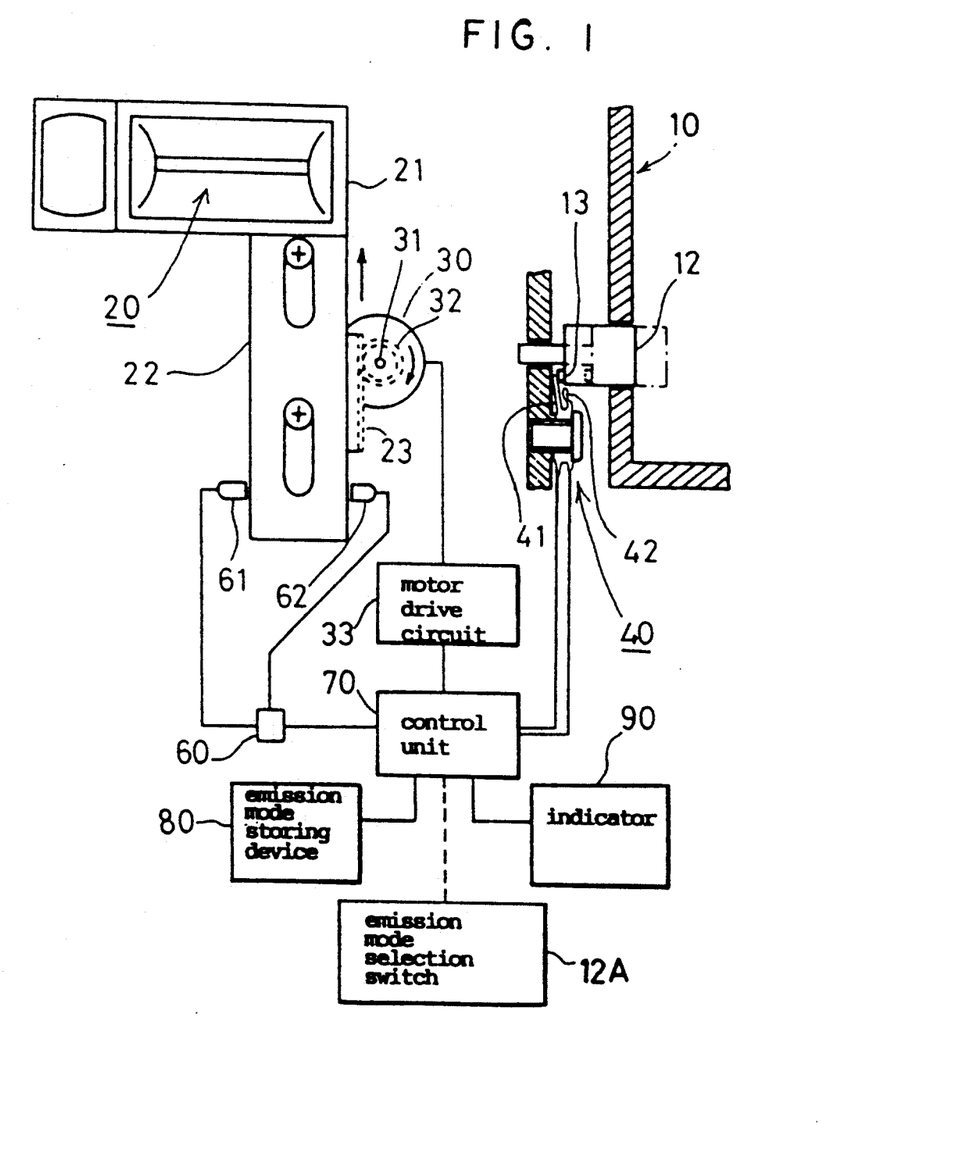
FIG. 1 is a systematic block diagram showing the connection of elements in a camera having a built-in pop-up strobe according to a first embodiment of the present invention.
Figure 2:
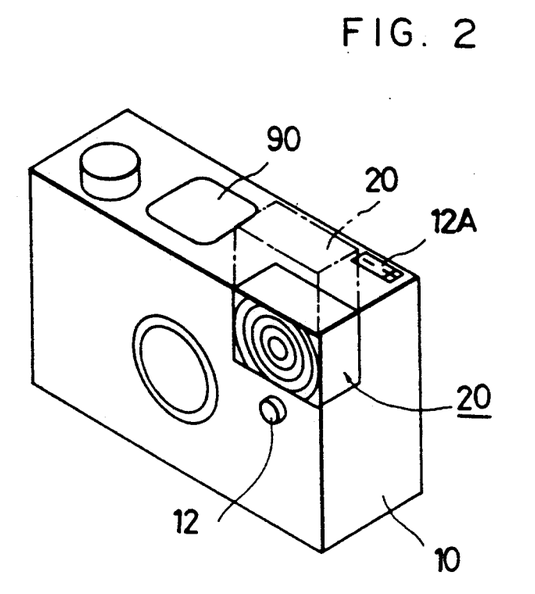
FIG. 2 is a perspective view of a camera having a built-in pop-up strobe as shown in FIG. 1.
Figure 3:
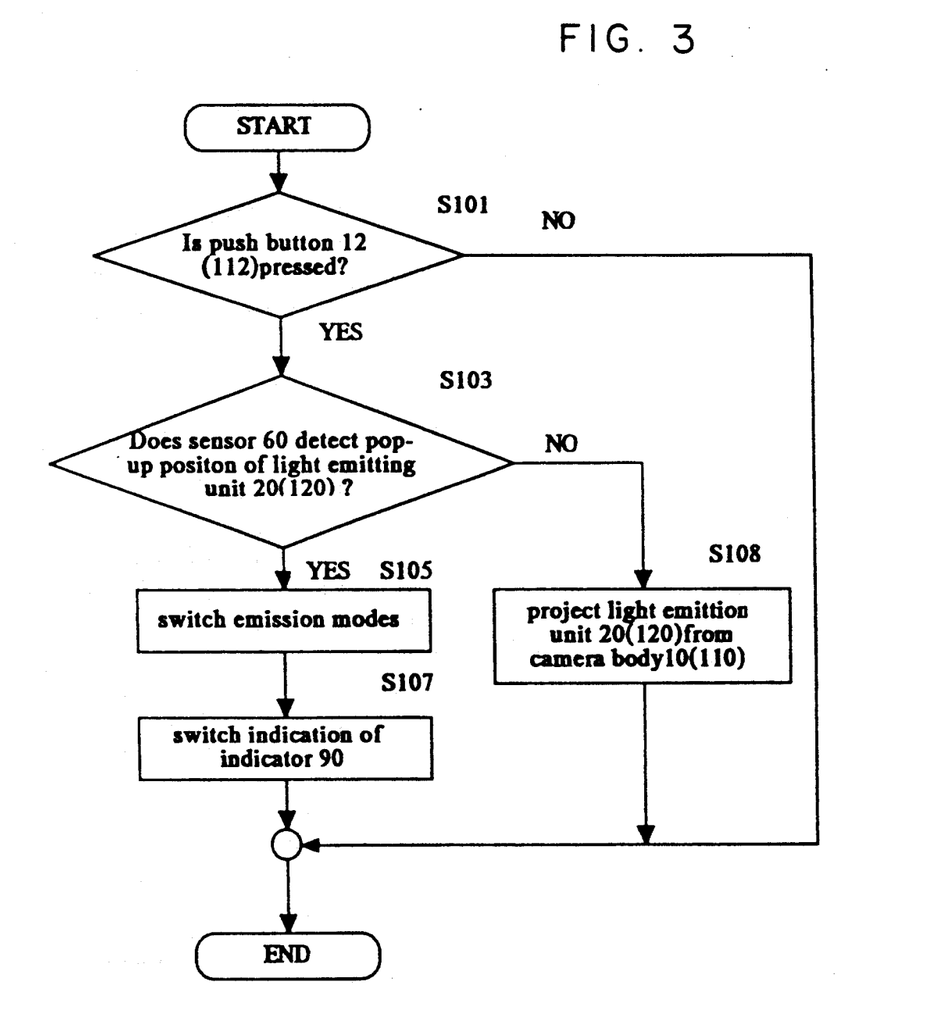
FIG. 3 is a flow chart of a control system of a camera having a built-in pop-up strobe as shown in FIG. 1.

FIGS. 1 through 3 show a first embodiment of the present invention, applied to a lens shutter type camera having a pop-up strobe incorporated therein.

Strobe light emitting unit 20 has housing 21 which is provided with frame 22 projecting therefrom, as shown in FIG. 1. Frame 22 is provided with rack 23 which is engaged with pinion 32 mounted to drive shaft 31 of motor 30 which is controlled by motor driving circuit 33 provided in camera body 10, so that when motor 30 is rotated, light emitting unit 20, which is usually retracted in camera body 10, in an inoperative position, is projected therefrom.

Camera body 10, which includes, the pop-up mechanism of light emitting unit 20, has push button 12, acting as a strobe actuating means, which can be actuated from outside the camera. Push button 12 is provided on its inner end with pressing pin 13 which protrudes therefrom in the vicinity of selection switch 40, which is provided in camera body 10. Selection switch 40 includes immovable contact 42 and movable contact 41 which is normally brought into contact with immovable contact 42. Movable contact 41 is disconnected from the immovable contact 42 when the push button 12 is depressed, as pressing pin 13 pushes movable contact 41.

The two contacts 41 and 42 of selection switch 40 are connected to control unit 70 which detects the operation of push button 12 in accordance with selection switch 40 which is selectively turned ON and OFF.

Detecting sensor 60 is provided in camera body 10 to detect the position of light emitting unit 20. Sensor 60 includes light emitting element 61 and light receiving element 62, so that when light emitting unit 20 is in the retracted position, the optical path from light emitting element 61 to light receiving element 62 is intercepted by frame 22, and when light emitting unit 20 is in the pop-up position, frame 22 does not obstruct optical path between the light emitting element 61 and light receiving element 62. Thus, control unit 70, which receives the detection signal of sensor 60 detects the projection (pop-up position) of light emitting unit 20 from camera body 10 when light emitted from light emitting element 61 is received by light receiving element 62.

Control unit 70 is connected to light emission mode storing device 80. Light emission mode storing device 80 includes, a ROM or the like, which stores a plurality of light, emission modes of light emitting unit 20, and indicator 90, which is made of, for example, a liquid crystal indicating plate or the like. The light emission modes include, for example, an automatic light modulation mode, a daylight synchronized flash mode (compulsive light emission mode), and a red-eye phenomenon preventing daylight synchronized flash mode (with a pre-emission function), etc. Since control of the light emission modes is per se known and since the subject of the present invention is not specifically directed to the emission mode control, no detailed explanation is given herein. The improvement of the present invention is related to pressing pin (push switch) 13 as a pop-up switch of light emitting unit 20. Namely, in the present invention, the selection of the light emission modes can be effected by push switch (pop-up switch) 13. Control unit 70 controls indicator 90 to indicate the selected light emission mode (e.g., by letters or figures).

Namely, when light emitting unit 20 is in the pop-up position and the electrical connection between the two contacts 41 and 42 of selection switch 40 is broken, control unit 70 switches the currently selected emission mode to a new emission mode stored in emission mode storing device 80, and commands indicator 90 to indicate the newly selected emission mode.

The camera, as constructed above, operates as follows: When the strobe function is desired, push button 12 is depressed, so that push pin 13 pushes movable contact 41 of selection switch 40 to separate it from immovable contact 42. As a result, selection switch 40 is turned OFF. In this state, since the light emitting unit 20 is still in the retracted position, as detected by sensor 60, control unit 70 drives motor 30 to project light emitting unit 20 from camera body 10 without changing the light emission modes.

When push button 12 is released, selection switch 40 is automatically returned to the initial position (ON position) by a spring (not shown) which continuously biases selection switch 40 to the ON position.

When push button 12 is again depressed while the strobe is in the pop-up position, movable contact 41 again separates from stationary contact 42, so that selection switch 40 is turned OFF. In this state, since light emitting unit 20 is in the pop-up position as detected by sensor 60, the control unit 70 switches current emission mode to one of the emission modes stored in emission mode storing means 80 without driving motor 30. Also in this state, the emission modes are switched every time push button 12 is depressed. The selected emission mode is indicated in indicator 90 provided in the view finder of camera body 10, as mentioned above. The push button 12 can include any type of switch capable of selecting the various emission modes of the strobe, such as, e.g., by sequential operation of the switch.

FIG. 3 shows a flow chart of the operations of control unit 70. In FIG. 3, at step S101, the control unit 70 checks whether or not push button 12 is depressed. If push button 12 is depressed, control unit 70 checks whether or not sensor 60 detects light emitting unit 20 to be in the pop-up position at step S103. If and only if light emitting unit 20 is in the pop-up position, the emission modes are switched every time push button 12 is depressed (step S105). The selected emission mode is indicated in indicator 90 at step S107.

If push button 12 is not depressed at step S101, control ends. If the light emitting unit 20 is in the retracted position at step S103, the depressing of push button 12 will generate a pop-up signal to project light emitting unit 20 from camera body 10, so that the drive signal is sent to motor driving circuit 33 to move light emitting unit 20 (step S108).

FIGS. 4 through 6B show a second embodiment applied to a single lens reflex camera having a pop-up strobe incorporated therein.

Figure 4:
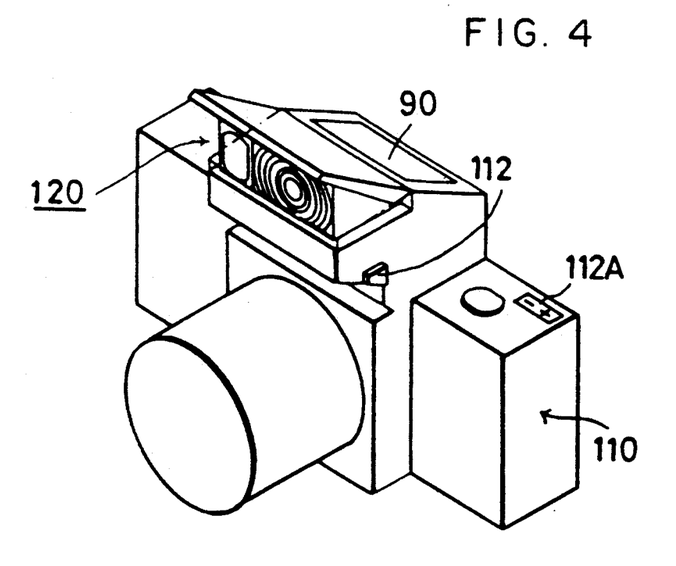
FIG. 4 is a perspective view of a camera having a built-in pop-up strobe, according to a second embodiment of the present invention.

Light emitting unit 120 is provided on a pentagonal prism of single lens reflex camera body 110 so as to project from and retract into camera body 110. Camera body 110 is provided with push button 112 as an actuating means, which is actuated to project light emitting unit 120 and switch the emission modes.

Housing 121 of light emitting unit 120 is provided with frames 122 extending from opposite sides thereof. Arm 130 is pivoted at its front end to an intermediate portion of the frames 122 through pivot shaft 131. The frames 122 are provided on the free ends thereof with bosses 123 which are movably fitted in corresponding arched guide holes 140 formed on a base (not shown) and are continuously biased by coil springs 150 in the direction L in FIG. 5A, i.e., the pop-up direction.

Arm 130 is rotatably connected at the base end thereof to the base and has a substantially triangular abutment 133 formed on the intermediate portion thereof. Side face 134 of abutment 133 bears against end face 161 of engaging lever 160 which is movable in the direction perpendicular to the plane of the drawings of FIG. 5a, i.e., the right and left directions in FIG. 6A, relative to the base when light emitting unit 120 is in the retracted position, as shown in FIG. 5A, so that engaging lever 160 maintains light emitting unit 120 in the retracted position against rotational biasing force of the arm 130 caused by springs 150 bearing against the bosses 123 in direction M in FIG. 5A.

Figure 5A:
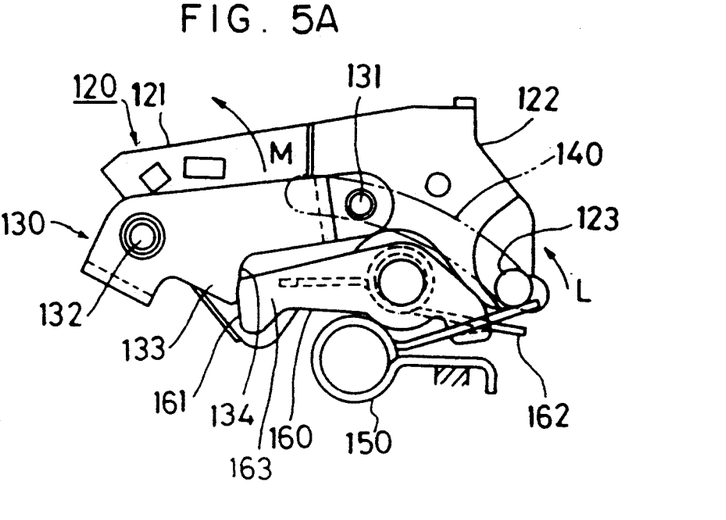
FIG. 5A is a side elevational view of a built-in pop-up strobe of the camera shown in FIG. 4, in a retracted position in which the light emitter is retracted.
Figure 5B:
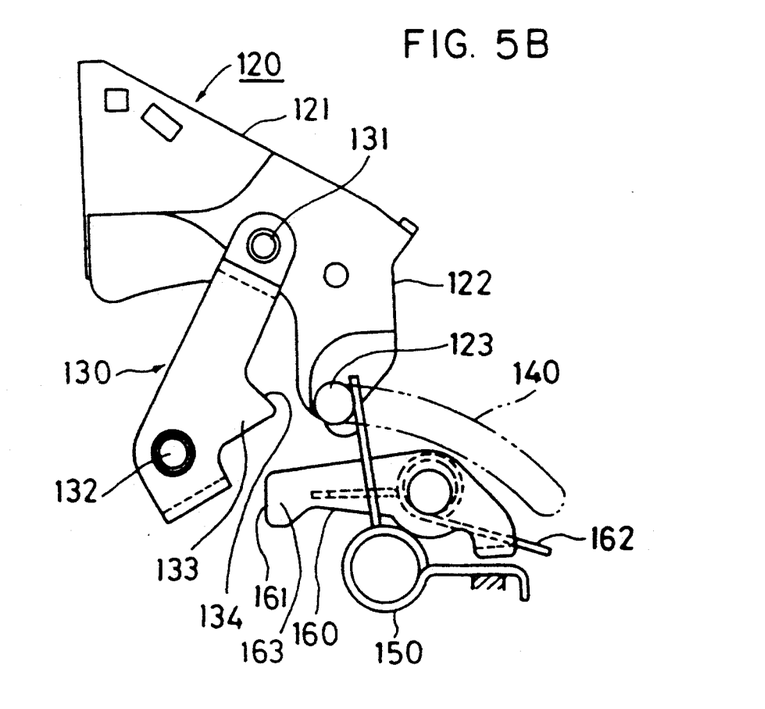
FIG. 5B is a side elevational view of a built-in pop-up strobe of the camera shown in FIG. 4, in the pop-up position in which the light emitter projected from the camera body.

Engaging lever 160 is continuously biased by an engaging spring 162 in the direction out of the plane of the drawings of FIGS. 5A and 5B. In this position, end face 161 of engaging lever 160 bears against side face 134 of abutment 133 to hold the latter in the retracted position.

When front end 163 of engaging lever 160 is pressed, in a direction into the plane of the drawings, side face 134 of abutment 133 is disengaged from side face 161 of engaging lever 160. Consequently, spring force of spring 150 acts on arm 130 through bosses 123 in the direction M in FIG. 5A forcing light emitting unit 120 up and out of the camera body 110 to position shown in FIG. 5B. When pressure is withdrawn from engaging lever 160, the engaging lever 160 returns to its original position by the bias of engaging spring 162.

Rod 114 of push button 112 bears on the side of engaging lever 160 that is located opposite engaging spring 162. Push button 112 is provided on its inner side face with pressing pin 113 projecting therefrom.

Selection switch 40 similar to the selection switch 40, in the first embodiment, is provided in the vicinity of pressing pin 113. Movable contact 41 of selection switch 40 is normally in contact with stationary contact 42, as shown in FIG. 6A, and is pushed by pressing pin 113 to be disconnected therefrom when push button 112 is depressed, as shown in FIG. 6B.

Figure 6A:
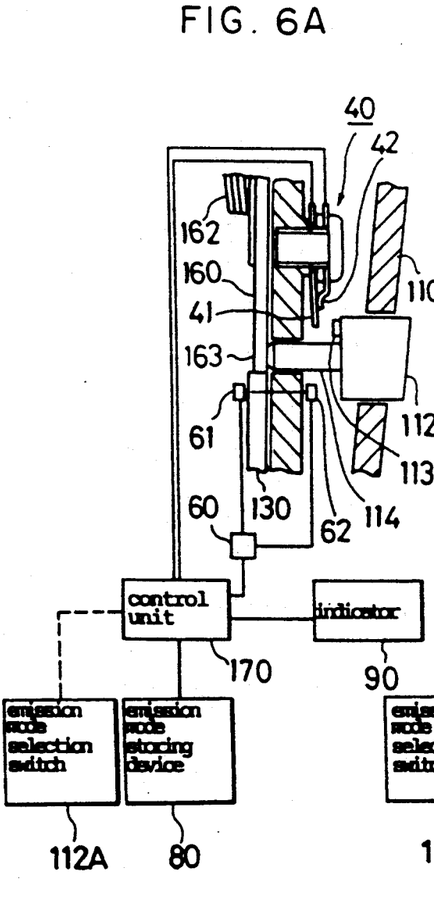
FIG. 6A is a systematic block diagram showing the connection of elements in a camera, shown in FIG. 4, having a built-in pop-up strobe in a retracted position in which the light emitter is retracted, according to a second embodiment of the present invention.
Figure 6B:
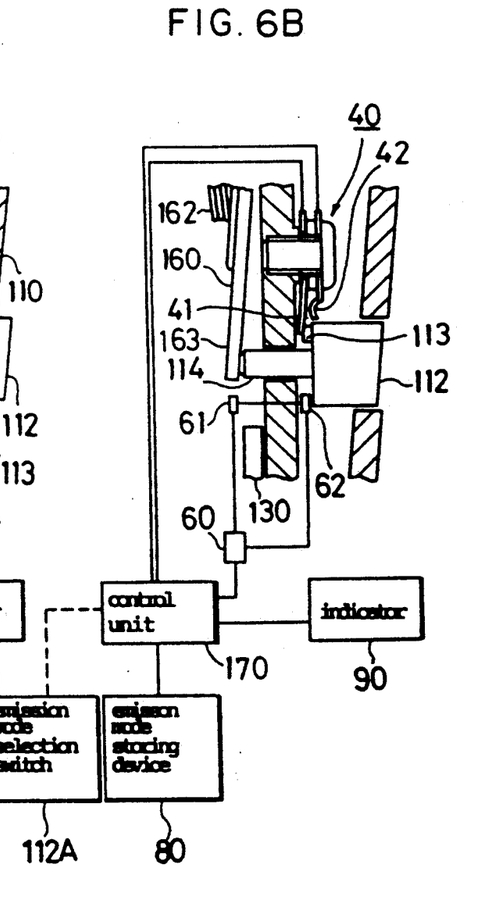
FIG. 6B is a systematic block diagram similar to FIG. 6A, but the pop-up strobe is shown in the pop-up position in which the light emitter projected from the camera body.

Light emitting element 61 and light receiving element 62 are located in a manner in which the optical path therebetween is intercepted when arm 130 is in the position shown in FIGS. 5A and 6A corresponding to the retracted position of light emitting unit 120. Conversely, when arm 130 is in the position shown in FIGS. 5B and 6B corresponding to the pop-up position of light emitting unit 120, light emitted from light emitting element 61 will be received by light receiving element 62. Sensor 60 and the two contacts 41 and 42 of selection switch 40 are connected to control unit 170, similar to the first embodiment.

Emission mode storing device 80 and indicator 90, connected to the control unit 170 are the same as those in the first embodiment mentioned above.

In a single lens reflex camera as constructed above, when strobe flash is desired, push button 112 is depressed, so that pressing pin 113 of push button 112 comes into contact with movable contact 41 of selection switch 40 to switch selection switch 40 from the ON position to the OFF position.

In this state, since light emitting unit 120 is still in the retracted position, this is detected by the sensor 60, and control unit 170 does not change the light emission modes. Rod 114 of push button 112 pushes engaging lever 160 to disengage abutment 133 from engaging lever 160 to thereby project light emitting unit 120 from camera body 110.

When push button 112 is released, selection switch 40 is automatically returned to the initial position (ON position) by a spring (not shown) which continuously biases selection switch 40 to the ON position.

When push button 112 is again depressed when the strobe is in the pop-up position, movable contact 41 separates from stationary contact 42, so that selection switch 40 is turned OFF. In this state, similar to the first embodiment, the emission mode is switched every time push button 112 is depressed. The selected emission mode is indicated, for example, by letters in indicator 90, provided in the view finder of camera body 110. Namely, the control shown in FIG. 3 is performed also in the second embodiment.

Figure 7:
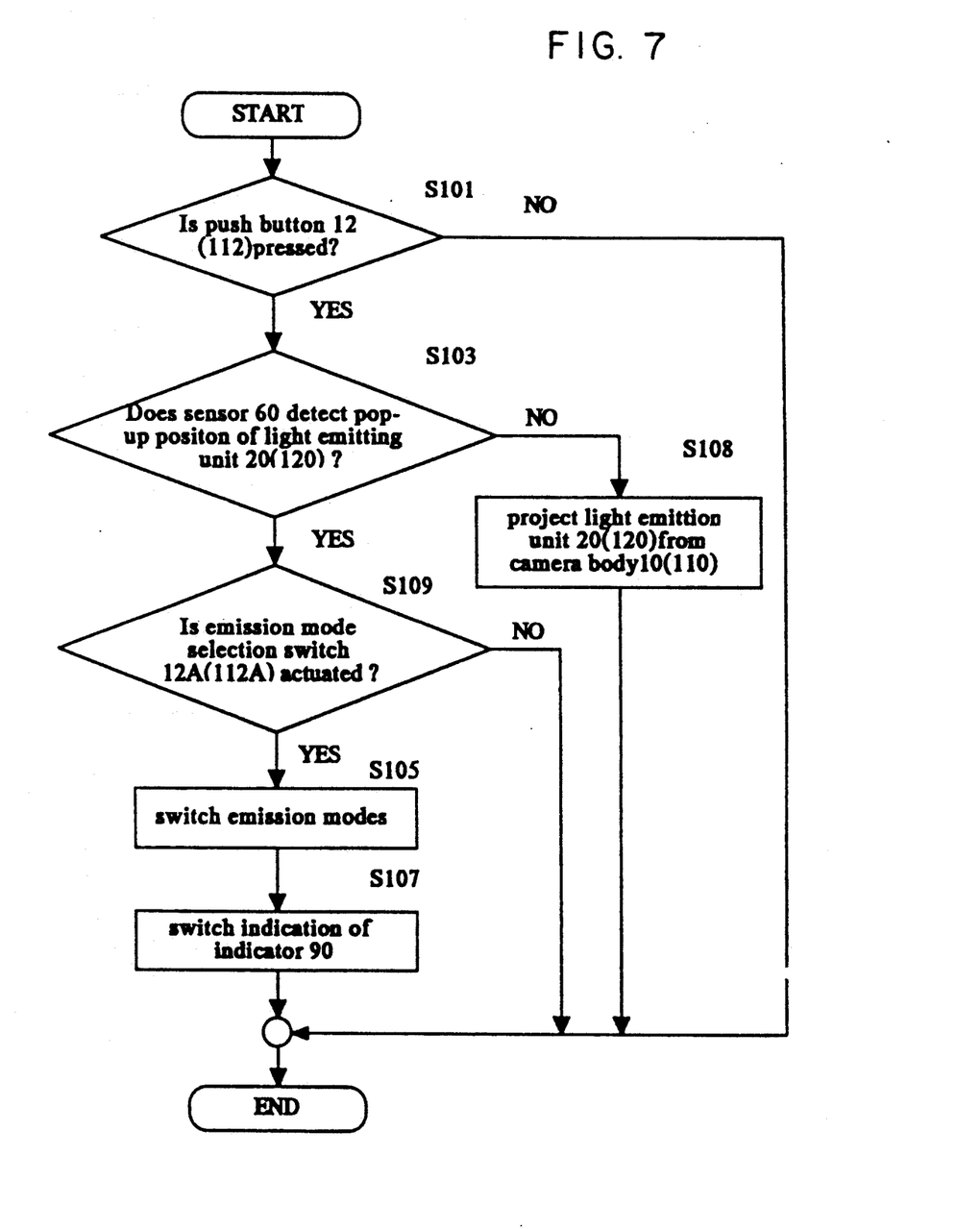
FIG. 7 is a flow chart of a control system of a camera having a built-in pop-up strobe, according to a third embodiment of the present invention.

In the first and second embodiments as mentioned above, the emission modes can be easily switched every time push button 12 or 112 is pressed after light emitting unit 20 or 120 is brought into the pop-up position by push button 12 or 112. However, if push button 12 or 112 is depressed by mistake, the change of the emission modes still takes place To prevent this, it is possible to provide another emission mode changing switch 12A or 112A in addition to push button 12 or 112, as shown in FIG. 7. Namely, in the control shown in FIG. 7, even if push button 12 or 112 is accidentally pressed after the strobe is popped-up, the emission mode does not change. The additional emission mode changing switch 12A or 112A can be provided for example on the outer surface of camera body 10 or 110, as shown in FIGS. 2 or 4. Preferably, emission mode changing switch 12A or 112A is realized by an existing up-down switch which is adapted to manually set a shutter speed, a diaphragm value, or an exposure correction value, etc. The operation signals of the emission mode changing switch 12A or 112A are supplied to the control unit 70 or 170 (see FIGS. 1, 6A and 6B). As long as the additional emission mode changing switch 12A is in the ON position, the emission mode is changed every time the switch 12 (112) is actuated.

In the embodiment illustrated in FIG. 7, additional step S109 is inserted between steps S103 and S105 in FIG. 3 to check whether or not emission mode selection switch 12A or 112A is actuated. If the emission mode selection switch 12A or 112A is actuated at step S109, the change of the emission modes and the indication of selected emission mode are carried out at steps S105 and S107; respectively. If the emission mode selection switch 12A or 112A is not actuated at step S109, control ends.

FIGS. 8 through 12 show fourth embodiment of present invention.

Figure 8:
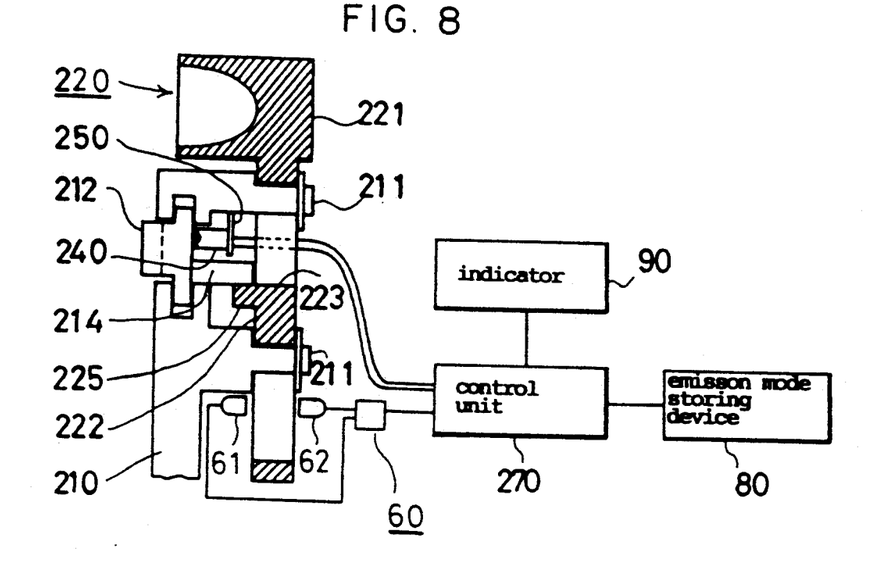
FIG. 8 is a systematic block diagram showing the connection of elements in a camera having a built-in pop-up strobe according to a fourth embodiment of the present invention.

In this embodiment, the push button switch 12 or 112 in the first or second embodiment is replaced with a slide switch 212. Slide switch 212 is slidable to selectively occupy a first position in which light emitting unit 20 is held in the retracted position, a second position in which light emitting unit 20 is held in the pop-up position, and a third position beyond the second position. The movement of slide switch 212 from the second position to the third position causes a change in the emission modes while maintaining the pop-up position of the light emitting unit.

Alternatively, it is possible to provide a slide switch which is slidable to selectively occupy only the first position or the second position. In this alternative, the light emitting unit which is in the retracted position can be moved to the pop-up position when the slide switch slides to the second position from the first position, and after the light emitting unit has been moved to the pop-up position, the emission modes can be changed when the slide switch is subsequently moved to the second position from the first position.

Light emitting unit 220 is retractably attached to camera body 210 by inserting pins 211, the inserting pins 211 project from the camera body 210 into corresponding elongated holes 223 which are formed in frame 222 extending from housing 221 of light emitting unit 220. Light emitting unit 220 is biased to project from camera body 210 by spring 230 provided between hook 224 formed at the end of frame 222 and engaging pin 213 of camera body 210.

Frame 222 has an abutment 225 which is engaged by engaging pin 214 of slide member 212 which is supported by camera body 210 when light emitting unit 220 is retracted into camera body 210 against the spring force of spring 230. Slide member 212 is slidably biased in the lateral direction by spring 231 so that engaging pin 214 engages with upper surface 225a of abutment 225. The engagement between the engaging pin 214 and abutment 225 of frame 222 is released when slide member (actuating member) 212 slides to an intermediate position (which will be referred to as a second position hereinafter) located at the center of slidable range. The disengagement of the engaging pin 214 from abutment 225 enables light emitting unit 220 to move to the pop-up position, so that engaging pin 214 comes into contact with vertical guide surface 225b of abutment 225 to be held in the second position.

Figure 10:
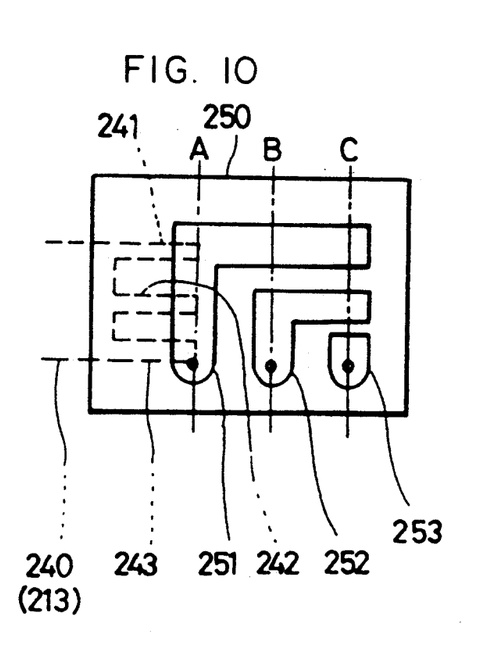
FIG. 10 is a plan view of a conductor pattern, the connection of which is controlled by a slide switch in a camera having a built-in pop-up strobe as shown in FIG. 8.
Figure 11:
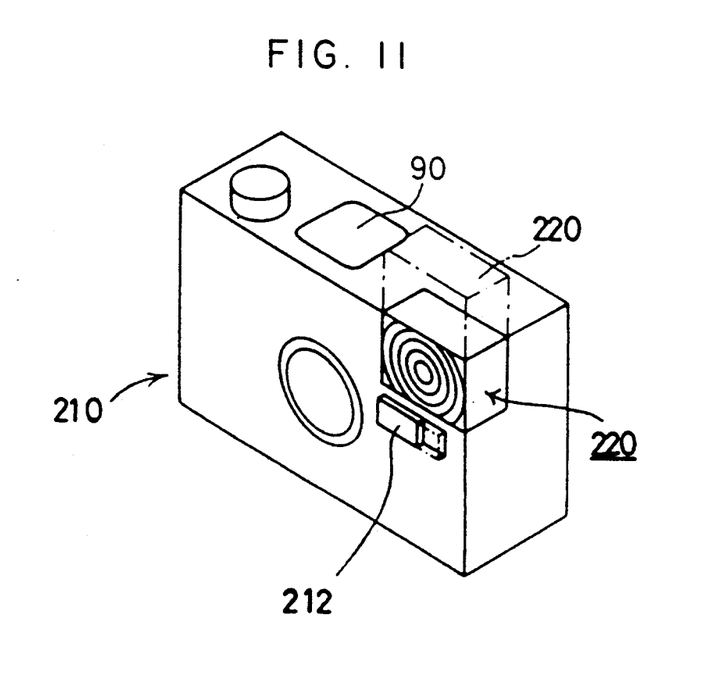
FIG. 11 is a perspective view of a camera having a built-in pop-up strobe as shown in FIG. 8 according to a fourth embodiment of the present invention; and, FIG. 12 is a flow chart of a control system of a camera having a built-in pop-up strobe, as shown in FIG. 8, according to a fourth embodiment of the present invention.

Camera body 210 has a code plate 250 secured thereto, having three conductor areas including generally L-shaped first conductor area 251 as a grounding electrode, a generally L-shaped second conductor area 252, and third conductor area 253, as shown in FIG. 10.

Slide member 212 has brush 240 made of an electrically conductive material secured thereto, having at its front end three legs 241, 242 and 243 corresponding to the three conductor areas 251, 252 and 253.

When slide member 212 is in the initial position (which will be referred to as a first position hereinafter), the three legs 241, 242 and 243 of brush 240 are all located on first conductor area 251 of code plate 250, as shown by a dotted and dashed line "A" in FIG. 10, with the three conductor areas 251, 252 and 253 being independent from one another (i.e., no electrical connection is established between the conductor areas).

When slide member 212 is moved to the second position from the first position, the leg 241 of brush 240 is located on first conductor area 251, and the remaining two legs 242 and 243 are located on second conductor area 252 of code plate 250, as shown by a dotted and dashed line "B" in FIG. 10, so that the first and second conductor areas 251 and 252 are short-circuited.

When slide member 212 is moved to the extremity corresponding to the largest displacement (which will be referred to as a third position hereinafter) due to a further slide movement thereof, legs 241, 242 and 243 of brush 240 are located on first, second and third conductor areas 251, 252 and 253, respectively, as shown by a dotted and dashed line "C" in FIG. 10, so that all of the first, second, and third conductor areas 251, 252 and 253 are short-circuited.

Sensor 60, which includes of a light emitting element 61 and light receiving element 62, is placed so that the optical path between the light emitting and receiving elements 61 and 62 is intercepted by frame 222 when light emitting unit 20 is in the retracted position, similar to the above-mentioned embodiments. Conversely, when light emitting unit 20 is in the pop-up position, light emitted from light emitting element 61 is received by light receiving element 62.

First, second and third conductor areas 251, 252 and 253 of code plate 250 and sensor 60 are connected to control unit 270 which checks the open circuit and short circuit between the three conductor areas 251, 252 and 253, and the pop-up position and the retracted position of light emitting unit 20.

Emission mode storing means 80 (e.g., ROM) in which a plurality of light emission modes are stored and indicator 90 (e.g., liquid crystal plate) are connected to control unit 270, similarly to the first and second embodiments mentioned above.

Figure 9:
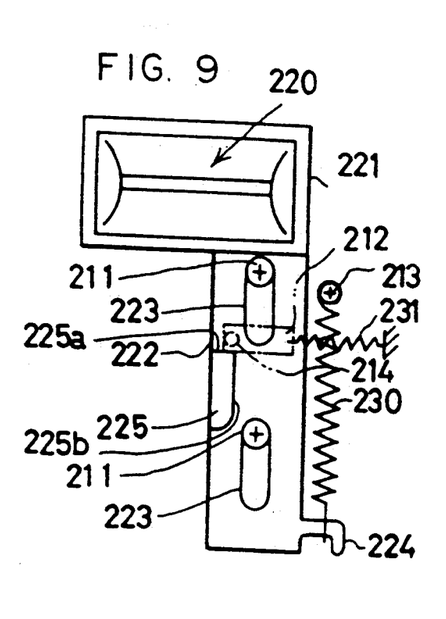
FIG. 9 is a front elevational view of a light emitter of a camera having a built-in pop-up strobe as shown in FIG. 8.

In a camera having the built-in strobe of the present invention, as constructed above, when the strobe is used, slide member 212 is moved to the second position against force of spring 231 to disengage the engaging pin 214 from upper surface 225a of abutment 225, so that light emitting unit 220 is popped up from the camera body 210 by force of the spring 230, as shown in FIG. 9.

Movement of the slide member 212 to the second position causes legs 241, 242 and 243 of brush 240 to move to position "B" from position "A" in FIG. 10, so that first and second conductor areas 251 and 252 are short-circuited. As a result, control unit 270, which detects the short-circuit, checks whether sensor 60 has detected the pop-up position of light emitting unit 220. When light emitting unit 270 is in the pop-up position, a permission signal which permits light emitting unit 220 to emit light, is supplied to a battery charge system (not shown) simultaneously with the establishment of the electrical connection between conductor areas 251 and 252. Thus, light emitting unit 220 is in a position to emit flash light.

When slide member 212 is moved to the third position from the second position, legs 241, 242 and 243 of brush 240 are moved to position "C" from position "B" in FIG. 10. As a result, the first, second and third conductor areas 251, 252 and 253 are all short-circuited.

Consequently, light emitting unit 220 is kept in a position to emit a flash since first conductor area 251 and second conductor area 252 remain short-circuited, and control unit 70, which recognizes the short circuit between third conductor area 253 and the first and second conductor areas 251 and 252 checks whether sensor 60 has detected the pop-up position of light emitting unit 220. If light emitting unit 220 is in the pop-up position, control unit 270 cancels the currently selected emission mode and selects one of the other emission modes stored in emission mode storing device 80. Thus, the emission mode of light emitting unit 220 changes every time slide member 212 is moved to the third position from the second position when light emitting unit 220 is in the pop-up position. The selected emission mode is indicated in indicator 90 by letters, for example.

Figure 12:
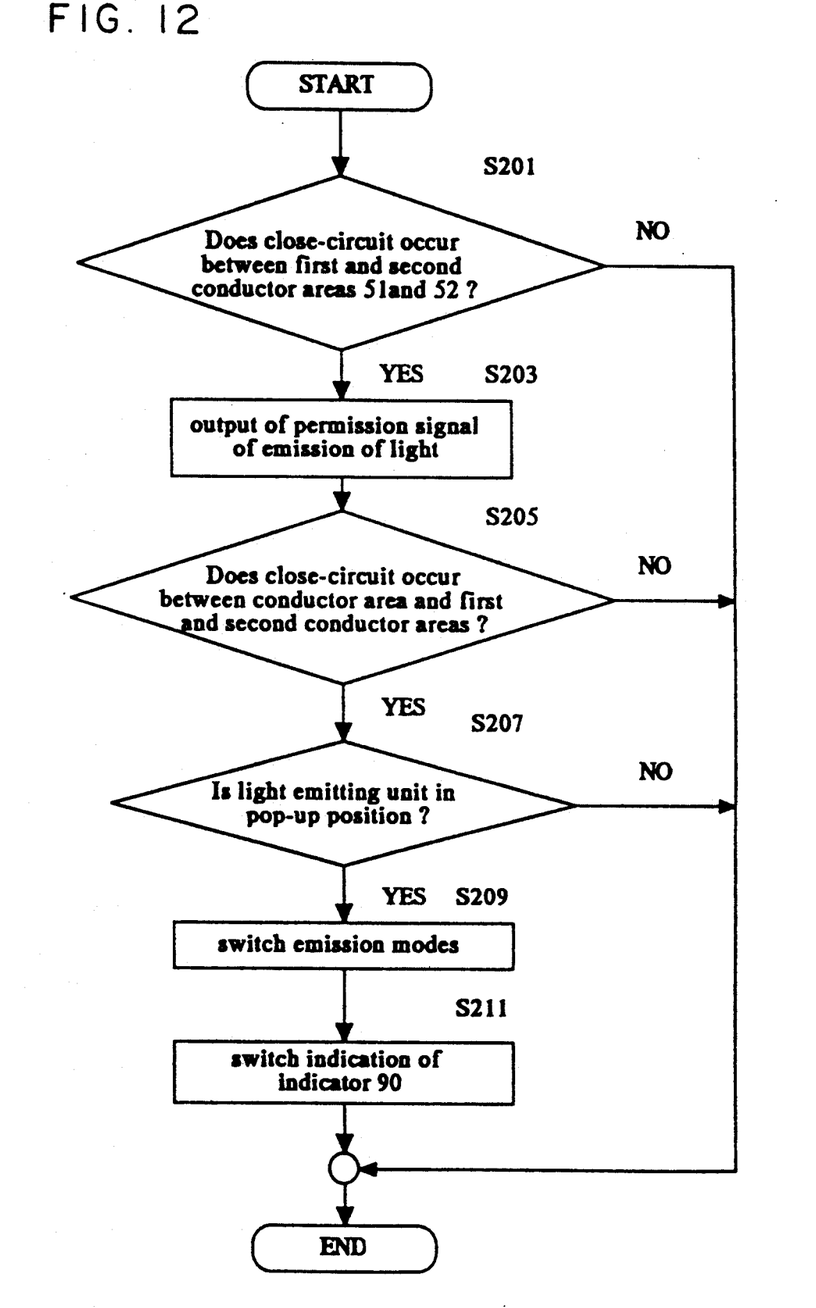

FIG. 12 shows a flow chart of operations of the control unit 270.

Control unit 270 checks whether or not the first and second conductor areas 251 and 252 of code plate 250 are short-circuited at step S201. If there is no short-circuit between first and second conductor areas 251 and 252, the control ends. Conversely, if a short-circuit exists between the first and second conductor areas 251 and 252, control unit 270 judges that slide member 212 has moved to the second position, so that the permission signal is supplied to the battery charge system to permit the emission of light by light emitting unit 220, at step S203. Thereafter, whether or not a short-circuit between third conductor area 253 and first and second conductor areas 251, 252 exists is checked at step S205. If there is no short-circuit at step S205, the control ends. Conversely, if a short-circuit exists between third conductor area 253 and first and second conductor areas 251 and 252, control unit 270 judges that slide member 212 has moved to the third position from the second position. Thereafter, whether or not light emitting unit 220 is in the pop-up position is checked by sensor 60 (step S207).

If light emitting unit 220 is not in the pop-up position at step S207, the control ends. Conversely, if light emitting unit 220 is in the pop-up position at step S207, control unit 270 cancels the currently selected emission mode and selects one of the other emission modes stored in emission mode storing device 80 (step S209). Thereafter, the control proceeds to step S211 in which the selected emission mode is indicated in indicator 90.

Although sensor 60, having a pair of light emitting and receiving elements 61 and 62, is used as a position detecting means in light emitting unit 20, 120 or 220 in the illustrated embodiments, it is possible to use a contact switch, such as a microswitch or the like which comes into contact with frame 22 when the light emitting unit is moved to the pop-up position. Alternatively, it is also possible to use a code plate different from code plate 50, in which the contact state thereof varies in accordance with the movement of frame 22.

Furthermore, it is possible to provide code plate 250 and brush 240 on slide member 212 and camera body 210, respectively. Alternatively, the brush can be connected to the grounding electrode. In this alternative, first conductor area 251 can be dispensed with, and only the conductor areas 252 and 253 shown in FIG. 9 are provided. In addition to the foregoing, although sensor 60 is provided to check the pop-up position of the light emitting unit for safety's sake in the illustrated embodiments, it is possible to effect the control based only on information from code plate 250 without using the sensor.

We claim:

1. A camera having a pop-up strobe incorporated therein, comprising;
   a light emitting unit which is movable between a retracted position in which said light emitting unit is retracted into a camera body and a pop-up position in which said light emitting unit projects from said camera body;
   means for driving said light emitting unit;
   manual actuating means for actuating said drive means to move said light emitting unit from said retracted position to said pop-up position; and
   mode changing means for changing light emission modes of said light emitting unit;
   wherein operation of said manual actuating means while said emitting unit is located at said pop-up position does not affect the position of said light emitting unit, and
   wherein said manual actuating means comprises at least a part of said mode changing means when said light emitting unit is in said pop-up position.

2. A camera having a pop-up strobe incorporated therein, according to claim 1, wherein said manual actuating means comprises a push button.

3. A camera having a pop-up strobe incorporated therein, according to claim 2, wherein said light emission modes are changed every time said push button is actuated when said light emitting unit is in said pop-up position.

4. A camera having a pop-up strobe incorporated therein, according to claim 1, further comprising a light emission mode selection switch which is actuated to change said light emission modes when said light emitting unit is in said pop-up position and when said manual actuating means is actuated.

5. A camera having a pop-up strobe incorporated therein, according to claim 1, wherein said manual actuating means comprises a slide member.

6. A camera having a pop-up strobe incorporated therein, according to claim 1, wherein said drive means comprises a motor.

7. A camera having a pop-up strobe incorporated therein, according to claim 1, wherein said drive means comprises a spring.

8. A camera having a pop-up strobe incorporated therein, according to claim 5, wherein said slide member is movable to selectively occupy three positions including first, second and third positions.

9. A camera having a pop-up strobe incorporated therein, according to claim 8, wherein the movement of said slide member from said first position to said second position causes said drive means to move said light emitting unit to said pop-up position from said retracted position and, wherein the movement of said slide member from said second position to said third position changes said light emission modes.

10. A camera having a pop-up strobe incorporated therein, comprising:
    a light emitting unit which is movable between a retracted position in which said light emitting unit is retracted into a camera body and a pop-up position in which said light emitting unit projects from said camera body;
    a manual actuating switch which is actuated to move said light emitting unit from said retracted position to said pop-up position; and
    a mode changing switch which is actuated to change light emission modes of said light emitting unit, said emission modes being changed only by the operation of said mode changing switch when said light emitting unit is in said pop-up position and when said manual actuating switch is actuated.

11. A camera having a pop-up strobe incorporated therein, according to claim 10, wherein said mode changing switch changes light emission modes of said light emitting unit without changing the position of said light emitting unit.

12. A camera having a pop-up strobe incorporated therein, comprising:
 a light emitting unit which is movable between a retracted position in which said light emitting unit is retracted into a camera body and a pop-up position in which said light emitting unit projects from said camera body;
 mode changing means for changing light emission modes of said light emitting unit;
 slidable actuating means for actuating movement of said light emitting unit;
 moving means for moving said light emitting unit to said pop-up position when said slidable actuating means is actuated while said light emitting unit is in said retracted position; and,
 wherein said means for changing said light emission mode is effected when said slidable actuating means is actuated while said light emitting unit is in said pop-up position, and wherein actuation of said slidable actuating means, while said light emitting unit is in said pop-up position, does not affect the position of said light emitting unit.

* * * * *